(12) United States Patent
Kawashima et al.

(10) Patent No.: US 11,665,395 B2
(45) Date of Patent: May 30, 2023

(54) VIEWER BEHAVIOR ESTIMATION APPARATUS, VIEWER BEHAVIOR ESTIMATION METHOD AND PROGRAM

(71) Applicant: Nippon Telegraph and Telephone Corporation, Tokyo (JP)

(72) Inventors: Kimiko Kawashima, Musashino (JP); Kazuhisa Yamagishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/044,887

(22) PCT Filed: Mar. 27, 2019

(86) PCT No.: PCT/JP2019/013071
§ 371 (c)(1),
(2) Date: Oct. 2, 2020

(87) PCT Pub. No.: WO2019/194034
PCT Pub. Date: Oct. 10, 2019

(65) Prior Publication Data
US 2021/0105531 A1    Apr. 8, 2021

(30) Foreign Application Priority Data
Apr. 3, 2018  (JP) .............................. JP2018-071844

(51) Int. Cl.
*H04N 21/442* (2011.01)
(52) U.S. Cl.
CPC .......................... *H04N 21/44204* (2013.01)

(58) Field of Classification Search
CPC ............. H04N 21/44204; H04N 17/00; H04N 21/2407; G06F 16/00; G06F 16/70; G06Q 10/04
See application file for complete search history.

(56) References Cited

U.S. PATENT DOCUMENTS

| | | | |
|---|---|---|---|
| 9,654,360 B1 * | 5/2017 | Kellicker | H04L 43/045 |
| 2010/0211966 A1 * | 8/2010 | Zhang | H04N 21/4756 725/10 |
| 2012/0117225 A1 * | 5/2012 | Kordasiewicz | H04N 17/004 709/224 |

(Continued)

OTHER PUBLICATIONS

He et al., "Understanding User Behavior in Large Scale Internet Video Service," 2015 International Conference on Cyber-Enabled Distributed Computing and Knowledge Discovery, Sep. 17, 2015, pp. 261-267.

(Continued)

*Primary Examiner* — Adil Ocak
(74) *Attorney, Agent, or Firm* — Fish & Richardson P.C.

(57) ABSTRACT

A watching behavior estimation device includes an input unit to which a value of a first index indicating a playback state of a video distributed via a network is input, and a calculation unit configured to calculate, by applying the value which is input to the input unit to a function indicating a relationship between the first index, and a second index regarding a behavior of a viewer of the video, an estimated value of the second index, thereby making it possible to estimate the behavior of the viewer of the video distributed via the network.

3 Claims, 7 Drawing Sheets

(56) References Cited

U.S. PATENT DOCUMENTS

| | | | | |
|---|---|---|---|---|
| 2013/0159498 | A1* | 6/2013 | Funge | H04L 43/045 |
| | | | | 709/224 |
| 2015/0326455 | A1* | 11/2015 | Hui | G06F 3/04842 |
| | | | | 715/736 |
| 2016/0112894 | A1* | 4/2016 | Lau | H04L 43/10 |
| | | | | 370/252 |
| 2016/0234078 | A1* | 8/2016 | Jana | H04L 47/30 |
| 2017/0359582 | A1* | 12/2017 | Kawano | H04N 19/124 |

OTHER PUBLICATIONS

Takahashi et al., "A Study on Factors Affecting Viewing Time of Adaptive Bitrate Video Distribution Service," The Institute of Electronics, Information and Communication Engineers (IEICE) 2018 Conference Discussion Paper Communication 2, 2018, p. 258, 4 pages (with English Translation).

Wang et al., "Characterizing the Correlation between Video Types and User Quality of Experience in the Large-Scale Internet Video Service," 2015 12th International Conference on Fuzzy Systems and Knowledge Discovery (FSKD), Aug. 15, 2015, pp. 2086-2092.

\* cited by examiner

VIEWER BEHAVIOR ESTIMATION APPARATUS, VIEWER BEHAVIOR ESTIMATION METHOD AND PROGRAM

CROSS-REFERENCE TO RELATED APPLICATIONS

This application is a National Stage application under 35 U.S.C. § 371 of International Application No. PCT/JP2019/013071, having an International Filing Date of Mar. 27, 2019, which claims priority to Japanese Application Serial No. 2018-071844, filed on Apr. 3, 2018. The disclosure of the prior application is considered part of the disclosure of this application, and is incorporated in its entirety into this application.

TECHNICAL FIELD

The present invention relates to a watching behavior estimation device, a watching behavior estimation method, and a program.

BACKGROUND ART

In recent years, with the spread of smartphones and tablet terminals, the number of users who use video distribution services in a mobile environment has been increasing. Network quality greatly varies according to use environments of users when various services are used in a mobile environment, resulting in possibility of low Quality of Experience (QoE) of users. Research and development of adaptive bit rate video distribution services such as HTTP Live Streaming (HLS) or Dynamic Adaptive Streaming over HTTP (MPEG-DASH) have been progressing to avoid such a situation. For HLS, for example, "Http live streaming. <https://developer.apple.com/streaming/>" may be referred to. For MPEG-DASH, "Information technology—Dynamic adaptive streaming over HTTP (DASH)—Part 1: Media presentation description and segment formats, ISO/IEC 23009-1: 2014, May 2014" may be referred to.

In an adaptive bit rate video distribution service, videos having various video qualities with different resolutions, frame rates, and bit rates are prepared in a distribution server. And a terminal that will play back a video requests the distribution server for a video having an appropriate video quality according to a throughput. As a result, quality deterioration is curbed. Further, efforts have been made to optimize QoE by predicting quality of a network and distributing videos with a coded bit rate in which video quality is somewhat degraded, but video playback stop, or the like is not caused. For the efforts to optimize QoE, for example, "Takanori Hayashi, "QoE-centric operation for optimizing user quality of experience", NTT Technical Journal, vol. 27, no. 7 pp. 16-19, July 2015" may be referred to.

Meanwhile, it is said that a variation in network quality leads not only to a decrease in QoE, but also to a reduction in engagement, meaning a watching time, or the like (NPLs 1 and 2). Because the decrease in engagement leads to cancellation of services, it is important for a service provider to maintain and improve the quality of video services on the basis of engagement in order to maintain and improve retention.

In the related art, engagement is ascertained by acquiring a watching time or watching time rate (a value obtained by dividing the watching time by a content length) of users (NPLs 1 and 2).

CITATION LIST

Non Patent Literature

NPL 1: Y. He, A. Wei, W. Zhang, and H. Xiao, "Understanding user behavior in large scale internet video service", Proc. 2015 Int. Conf. on CyberC, pp. 261-267, Xi'an, China, October 2015.

NPL 2: X. Wang, A. Wei, Y. Yang, and J. Ning, "Characterizing the correlation between video types and user quality of experience in the large-scale internet video service", Proc. of 2015 12th Int. Conf. on FSKD, pp. 2086-2092, Zhangjiajie, China, August 2015.

SUMMARY OF THE INVENTION

Technical Problem

However, the watching time and watching time rate are indexes that are recognized when a viewer stops watching, and the related art is not a technology for estimating a behavior of the viewer (such as stop of watching) before the viewer stops watching.

The present invention has been made in view of the above points, and an object of the present invention is to make it possible to estimate a behavior of a viewer of a video that is distributed via a network.

Means for Solving the Problem

To solve the above problem, a watching behavior estimation device includes an input unit to which a value of a first index indicating a playback state of a video distributed via a network is input; and a calculation unit configured to calculate, by applying the value which is input to the input unit to a function indicating a relationship between the first index, and a second index regarding a behavior of a viewer of the video, an estimated value of the second index.

Effects of the Invention

It is possible to estimate a behavior of a viewer of a video that is distributed via a network.

DESCRIPTION OF EMBODIMENTS

Figure 1:
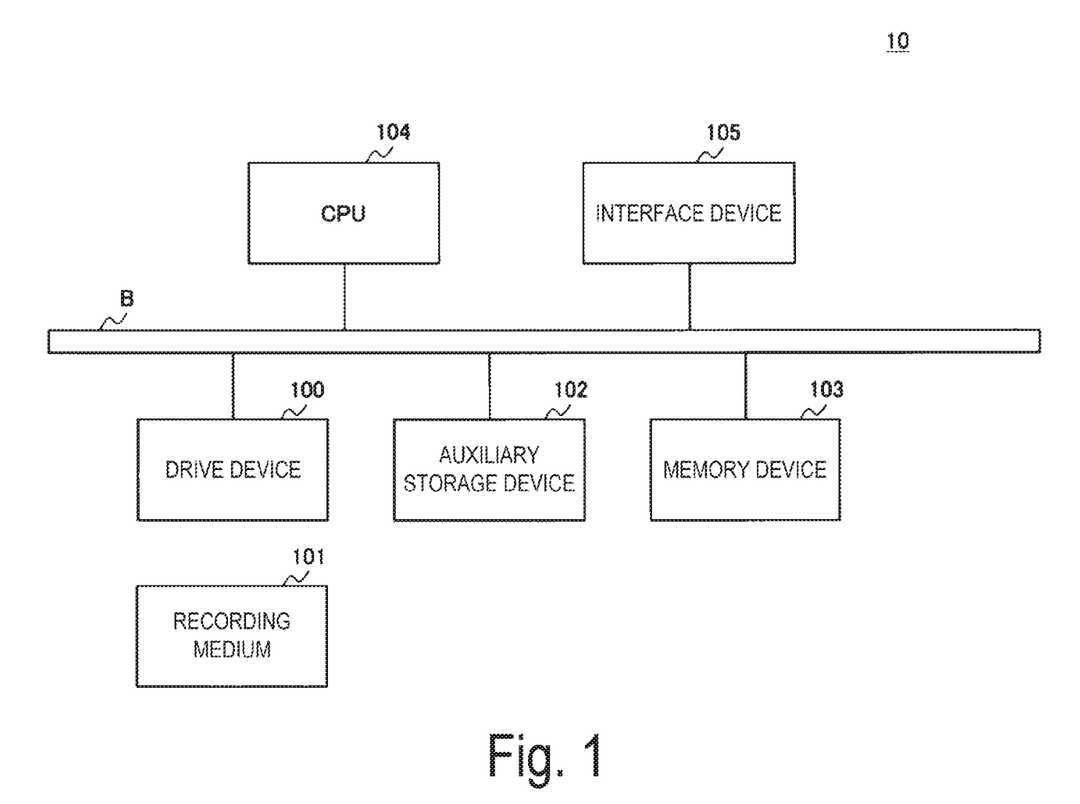
FIG. 1 is a diagram illustrating an example of a hardware configuration of a watching behavior estimation device 10 according to a first embodiment.

Hereinafter, embodiments of the present invention will be described with reference to the drawings. FIG. 1 is a diagram illustrating an example of a hardware configuration of a watching behavior estimation device 10 according to a first embodiment. The watching behavior estimation device 10 in FIG. 1 includes, for example, a drive device 100, an auxiliary storage device 102, a memory device 103, a CPU 104, and an interface device 105, which are interconnected by a bus B.

A program for realizing processing in the watching behavior estimation device 10 is provided by a recording medium 101 such as a CD-ROM. When the recording medium 101 in which the program has been stored is set in the drive device 100, the program is installed on the auxiliary storage device 102 from the recording medium 101 via the drive device 100. However, the program is not necessarily installed from the recording medium 101 and may be downloaded from another computer via a network. The auxiliary storage device 102 stores the installed program and also stores necessary files, data, or the like.

The memory device 103 reads and stores the program from the auxiliary storage device 102 when there is an instruction for activating the program. The CPU 104 executes a function related to the watching behavior estimation device 10 according to the program stored in the memory device 103. The interface device 105 is used as an interface for connection to the network.

In the embodiment, the watching behavior estimation device 10 estimates a watching behavior which is one of engagement indexes in adaptive bit rate video distribution, for a video that is distributed at an adaptive bit rate, by taking into account the following qualitative characteristics of characteristics 1 to 3. The characteristics 1 to 3 indicate a relationship between an index indicating a playback state of the video until watching of the video is stopped (a "factor index I" to be described below) and an index (hereinafter referred to as a "watching abandonment rate") regarding a behavior of a viewer of the video (hereinafter referred to as a "watching behavior"). In the embodiment, a "watching abandonment rate", which is a probability of abandonment of watching, is an example of an index regarding a watching behavior, and the watching abandonment rate is an estimation target. The characteristics 1 to 3 to be shown below were obtained from a watching abandonment experiment performed by the present inventor. The watching abandonment experiment is, for example, an experiment in which a watching behavior in the same playback state of the same video is observed for a plurality of viewers. Further, the watching abandonment rate is a percentage of viewers who stop watching among the plurality of viewers.

Figure 2:
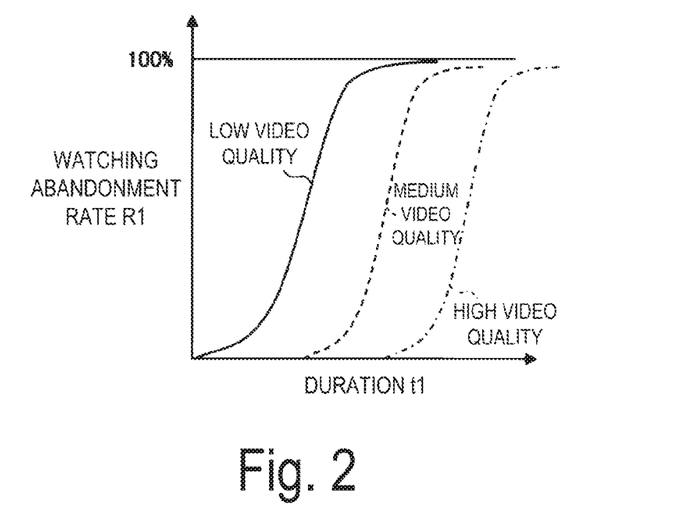
FIG. 2 is a diagram illustrating a characteristic 1, which is one of qualitative characteristics.

FIG. 2 is a diagram illustrating a characteristic 1, which is one of the qualitative characteristics. FIG. 2 illustrates that the number of users (viewers) who stop (abandon) watching increases over time when users watch a video with low video quality for a long time (that is, when playback of the video continues with low video quality). That is, for the characteristic 1, the watching abandonment rate R1 is determined by using a level of video quality (low video quality, medium video quality, and high video quality), and a duration t1 of a state of the video quality.

Figure 3:
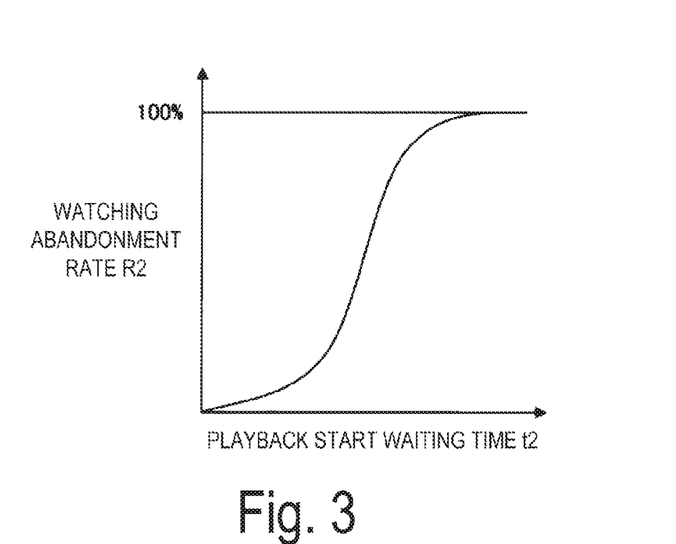
FIG. 3 is a diagram illustrating a characteristic 2, which is one of the qualitative characteristics.

FIG. 3 is a diagram illustrating a characteristic 2, which is one of the qualitative characteristics. FIG. 3 illustrates that the number of users who stop (abandon) watching increases when playback start waiting continues. That is, for specifying 2, the watching abandonment rate R2 is determined by using a playback start waiting time t2. The playback start waiting time t2 is a waiting time (elapsed time) until a video playback is started after a video playback instruction is input.

Figure 4:
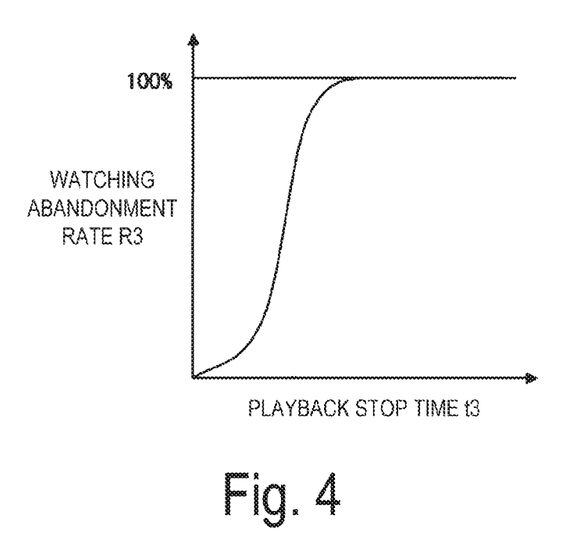
FIG. 4 is a diagram illustrating a characteristic 3, which is one of the qualitative characteristics.

FIG. 4 is a diagram illustrating a characteristic 3, which is one of the qualitative characteristics. FIG. 4 illustrates that the number of users who stop watching increases when playback stop continues. That is, for the characteristic 3, a watching abandonment rate R3 is determined by using a playback stop time 3. The playback stop time 3 refers to a duration of a stopped state when the playback has stopped after the start of playback. In the embodiment, the playback stop time 3 is a duration of one playback stop.

In order to take the above characteristics into account, the watching behavior estimation device 10 receives any one of factor indexes relevant to watching abandonment, such as (1) a resolution, a bit rate, a frame rate, and a duration t1, (2) the playback start waiting time t2, and (3) the playback stop time t3 as inputs, and derives any one of the watching abandonment rates R1 to R3 (hereinafter referred to as a "watching abandonment rate R" when R1 to R3 are not distinguished).

Figure 5:
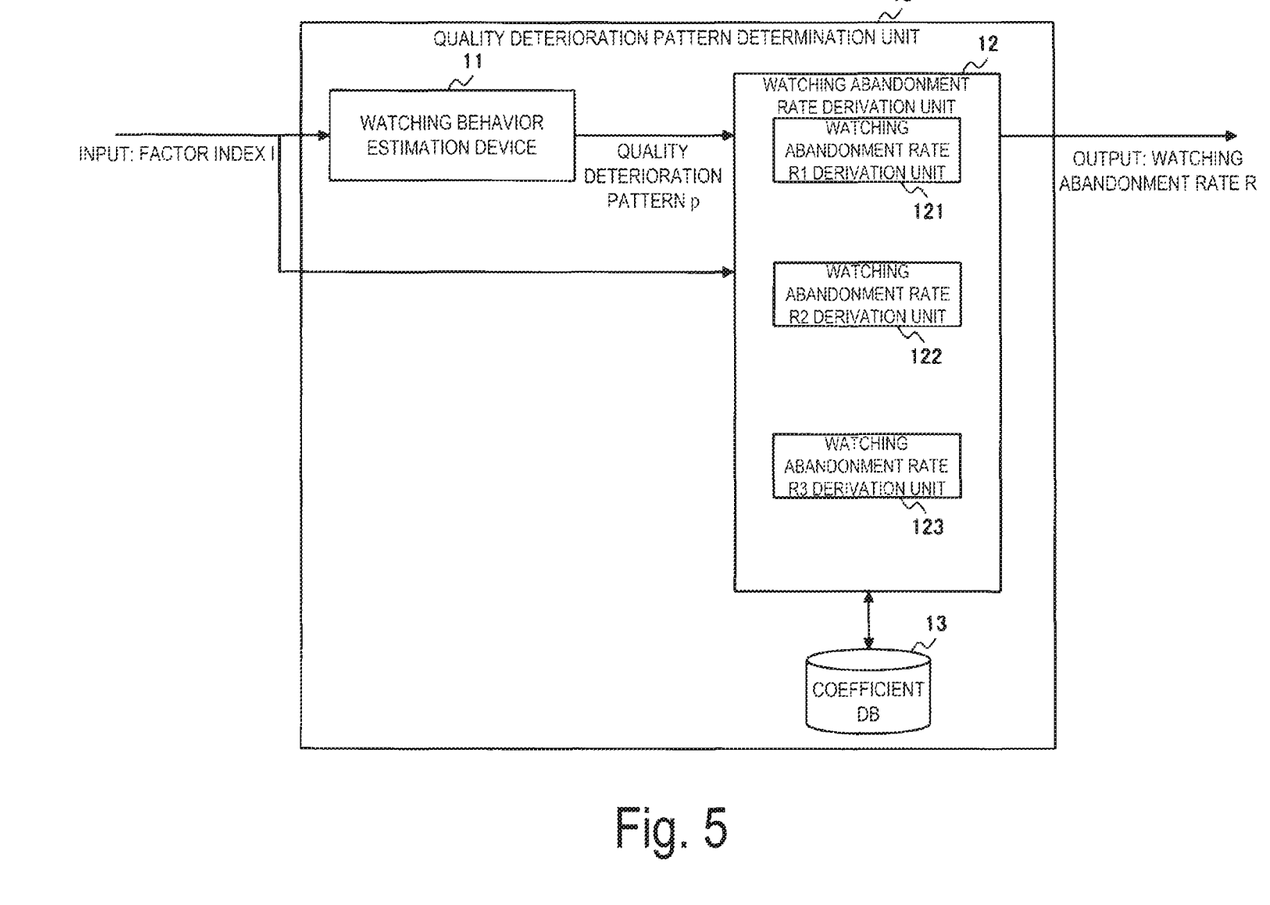
FIG. 5 is a diagram illustrating an example of a functional configuration of the watching behavior estimation device 10 according to the first embodiment.

FIG. 5 is a diagram illustrating an example of a functional configuration of the watching behavior estimation device 10 according to the first embodiment. In FIG. 5, the watching behavior estimation device 10 includes, for example, a quality deterioration pattern determination unit 11, and a watching abandonment rate derivation unit 12. Each of these units is implemented through processing of causing the CPU 104 to execute one or more programs installed on the watching behavior estimation device 10. The watching behavior estimation device 10 also uses a coefficient DB 13. The coefficient DB 13 can be realized by using, for example, the auxiliary storage device 102, or a storage device capable of connecting to the watching behavior estimation device 10 via a network.

The quality deterioration pattern determination unit 11 receives the factor index I as an input and outputs a quality deterioration pattern p. The quality deterioration pattern p is a value indicating which of characteristics 1 to 3 is used to derive the watching abandonment rate R, and has any one of values 1, 2, and 3. The value 1 indicates the characteristic 1, the value 2 indicates the characteristic 2, and the value 3 indicates the characteristic 3. The factor index I, for example, may be acquired from header information of an IP packet regarding the video distribution service, or may be acquired using other methods.

Figure 6:
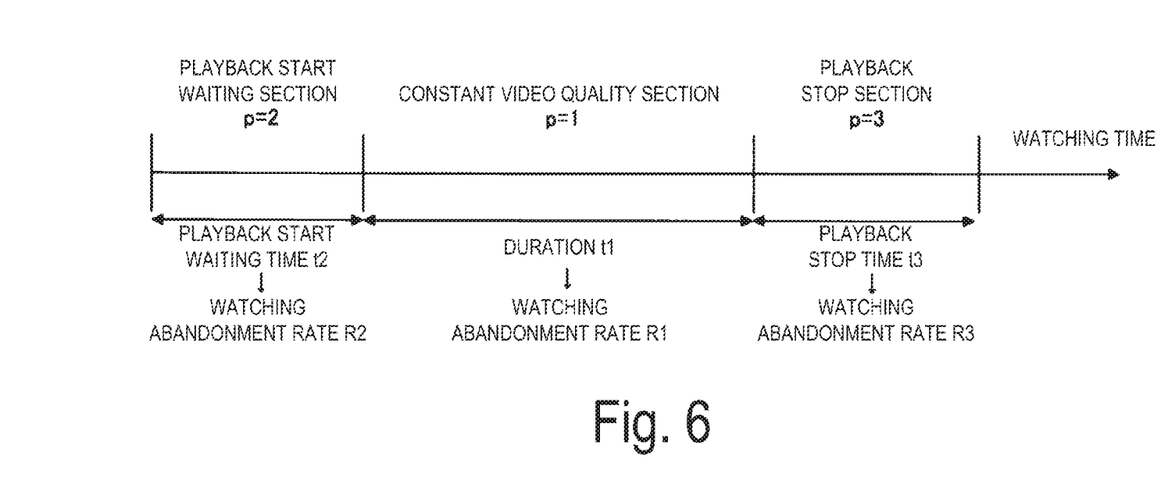
FIG. 6 is a diagram illustrating relationships of a quality deterioration pattern p with various times and a watching abandonment rate R.

The factor index I is any one of (1) a resolution re, a bit rate br, a frame rate fr, and a duration t1 (one time duration at video quality indicated by parameters such as the resolution re, the bit rate br, and the frame rate fr), (2) the playback start waiting time t2, and (3) the playback stop time t3. The quality deterioration pattern determination unit 11 outputs p=1 when the quality deterioration pattern determination unit 11 receives only (1) the resolution re, the bit rate br, the frame rate fr, and the duration t1 as the factor index I, outputs p=2 when the quality deterioration pattern determination unit 11 receives only (2) the playback start waiting time t2 as the factor index I, and outputs p=3 when the quality deterioration pattern determination unit 11 receives only (3) the playback stop time t3 as the factor index I. FIG. 6 illustrates relationships of the quality deterioration pattern p with various times of above mentioned and the watching abandonment rate R.

A value of the factor index I, and the quality deterioration pattern p output from the quality deterioration pattern determination unit 11 are input to the watching abandonment rate derivation unit 12, and an estimated value of the watching abandonment rate R is derived. In FIG. 5, the watching abandonment rate derivation unit 12 includes a watching abandonment rate R1 derivation unit 121, a watching abandonment rate R2 derivation unit 122, and a watching abandonment rate R3 derivation unit 123. The watching abandonment rate R1 derivation unit 121 receives (1) the resolution re, the bit rate br, the frame rate fr, and the duration t1 as inputs and derives (calculates), taking the characteristic 1 into account, an estimated value of the watching abandonment rate R1. The watching abandonment rate R2 derivation unit 122 receives (2) the playback start waiting time t2 as an input and derives (calculates), taking the characteristic 2 into account, an estimated value of the watching abandonment rate R2. The watching abandonment rate R3 derivation unit 123 receives (3) the playback stop time t3 as an input and derives (calculates), taking the characteristic 3 into account, an estimated value of the watching abandonment rate R3.

A determination of which of the watching abandonment rate R1 derivation unit 121, the watching abandonment rate R2 derivation unit 122, and the watching abandonment rate R3 derivation unit 123 is used to derive the watching abandonment rate R is made on the basis of the quality deterioration pattern p output from the quality deterioration pattern determination unit 11.

A coefficient of a watching abandonment rate derivation function that is used for derivation of the watching abandonment rate R is stored in the coefficient DB 13.

Figure 7:
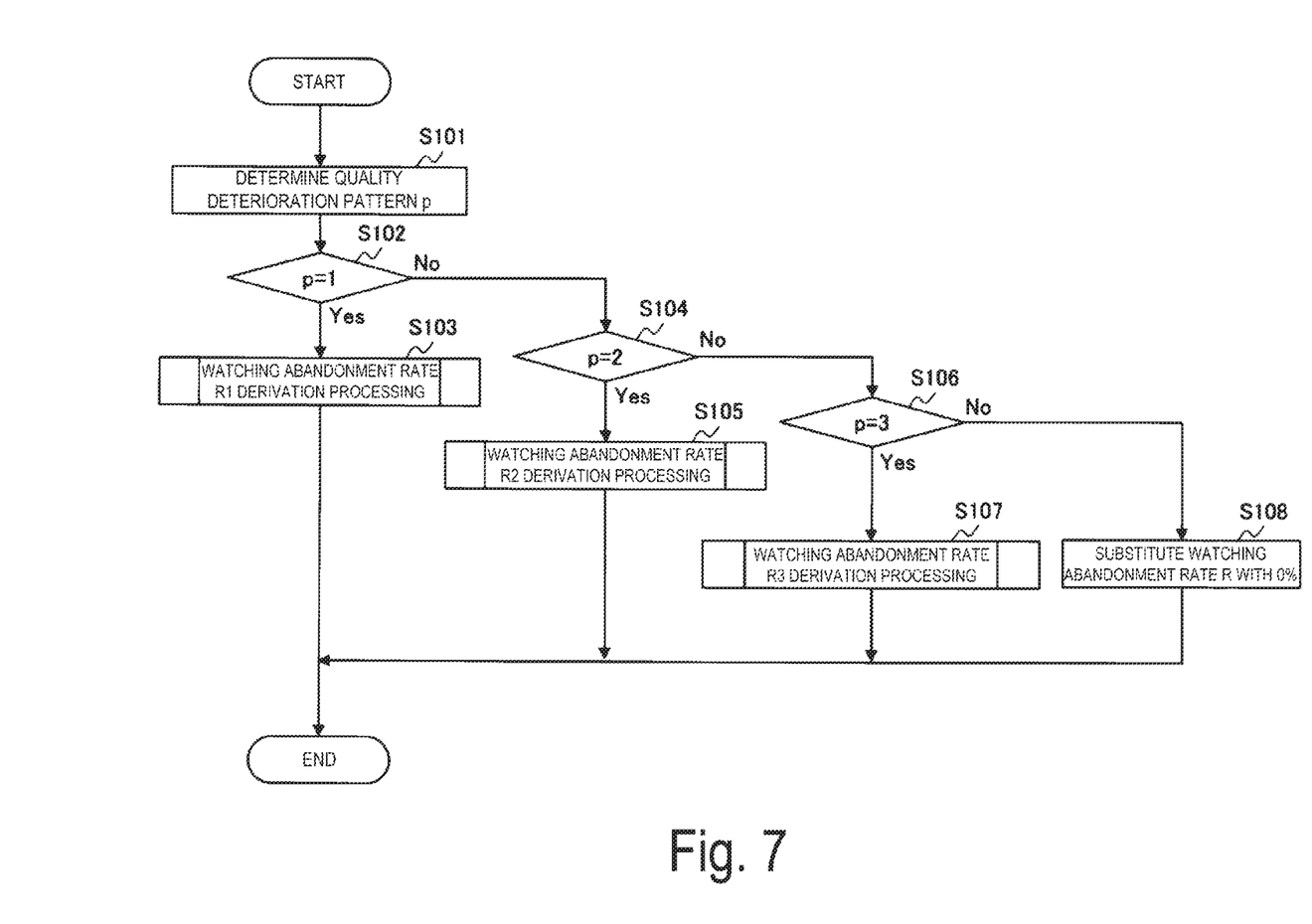
FIG. 7 is a flowchart illustrating an example of a processing procedure that is executed by the watching behavior estimation device 10.

Hereinafter, a processing procedure that is executed by the watching behavior estimation device 10 will be described. FIG. 7 is a flowchart illustrating an example of a processing procedure that is executed by the watching behavior estimation device 10.

In step S101, the quality deterioration pattern determination unit 11 determines the quality deterioration pattern p on the basis of content of the input factor index I, and inputs the factor index I and the quality deterioration pattern p to the watching abandonment rate derivation unit 12. A method of determining the quality deterioration pattern p is as described above.

When the quality deterioration pattern p is 1 (Yes in S102), the watching abandonment rate derivation unit 12 selects the watching abandonment rate R1 derivation unit 121, and causes the watching abandonment rate R1 derivation unit 121 to execute the watching abandonment rate R1 derivation processing (S103). When the quality deterioration pattern p is 2 (Yes in S104), the watching abandonment rate derivation unit 12 selects the watching abandonment rate R2 derivation unit 122 and causes the watching abandonment rate R2 derivation unit 122 to execute the watching abandonment rate R2 derivation processing (S105). When the quality deterioration pattern p is 3 (Yes in S106), the watching abandonment rate derivation unit 12 selects the watching abandonment rate R3 derivation unit 123, and causes the watching abandonment rate R3 derivation unit 123 to execute the watching abandonment rate R3 derivation processing (S107). When the quality deterioration pattern p is not 1, 2, or 3 (No in S106), the watching abandonment rate derivation unit 12 substitutes the watching abandonment rate R with 0% (S108).

The watching abandonment rate derivation unit 12 may display the watching abandonment rate R derived in step S103, S105, or S107 on a display device to visualize the watching abandonment rate R.

Figure 8:
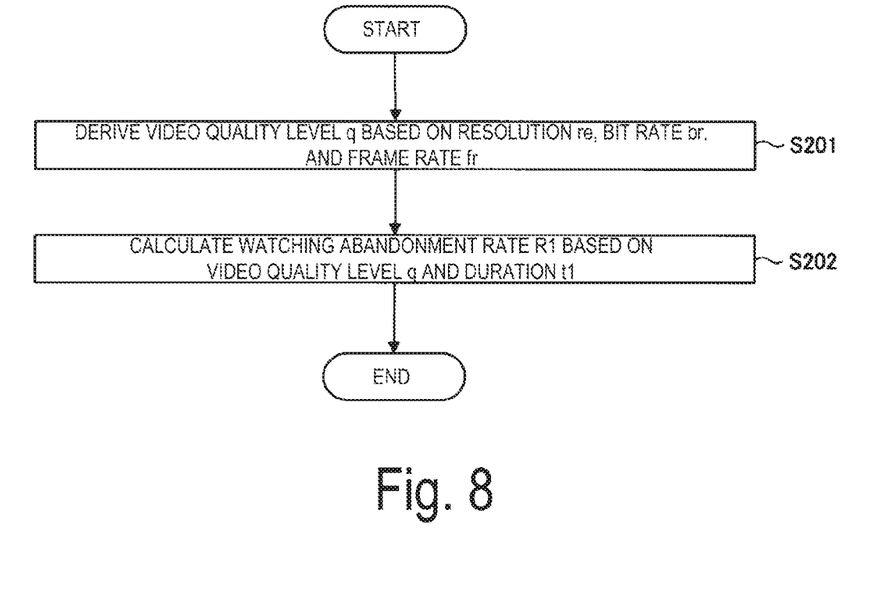
FIG. 8 is a flowchart illustrating an example of a processing procedure of processing of deriving a watching abandonment rate R1 according to the first embodiment.

Details of step S103 will then be described. FIG. 8 is a flowchart illustrating an example of a processing procedure for processing of deriving the watching abandonment rate R1 in the first embodiment.

In step S201, the watching abandonment rate R1 derivation unit 121 derives a video quality level q on the basis of the resolution re, the bit rate br, and the frame rate fr included in the factor index I. For example, the watching abandonment rate R1 derivation unit 121 may derive video quality Q using a technology such as "Parametric bitstream-based quality assessment of progressive download and adaptive audiovisual streaming services over reliable transport—Video quality estimation module, Recommendation ITU-T P.1203.1, December 2016", and derive the video quality level q according to the video quality Q. Specifically, the watching abandonment rate R1 derivation unit 121 sets the video quality level q=1 when the video quality Q is lower than 2.0, sets the video quality level q=2 when the video quality Q is equal to or higher than 2.0 and lower than 3.5, and sets the video quality level q=3 when the video quality Q is equal to or higher than 3.5. The video quality level q=1 corresponds to the low video quality in FIG. 2, the video quality level q=2 corresponds to the medium video quality in FIG. 2, and the video quality level q=3 corresponds to the high video quality in FIG. 2.

Next, the watching abandonment rate R1 derivation unit 121 applies the video quality level q, and the duration t1 included in the factor index I to the watching abandonment rate derivation function shown in equation (1) below to derive the estimated value of the watching abandonment rate R1 (S202). The watching abandonment rate derivation function is formulated by a logistic function because there is a logistic function relationship between the duration t1 and the watching abandonment rate R1 as illustrated in FIG. 2.

$$R1 = q \times (a11(q) + (a21(q) - a11(q))/(1 + (t1/a31(q))^{a41(q)})) \quad (1)$$

Here, the coefficients a11(q), a21(q), a31(q), and a41(q) are determined according to the video quality level q on the basis of results of the watching abandonment experiment that has been performed in advance, and stored in the coefficient DB 13.

Another polynomial, exponential function, or the like may be used instead of equation (1) as long as it is a function capable of expressing a characteristic that the watching abandonment rate R1 increases with degradation of video quality and an increase in the duration t1.

Next, details of step S105 in FIG. 7 (processing of deriving the watching abandonment rate R2) will be described.

The watching abandonment rate R2 derivation unit 122 applies the playback start waiting time t2 to the watching abandonment rate derivation function shown in equation (2) below to calculate the estimated value of the watching abandonment rate R2. The watching abandonment rate derivation function is formulated by a logistic function because there is a logistic function relationship between the playback start waiting time t2 and the watching abandonment rate R2 as illustrated in FIG. 3.

$$R2 = a12 + (a22 - a12)/(1 + (t2/a32)^{a42}) \quad (2)$$

Here, the coefficients a12, a22, a32, and a42 are determined on the basis of the results of the watching abandonment experiment that has been performed in advance, and are stored in the coefficient DB 13.

Another polynomial, exponential function, or the like may be used instead of equation (2) as long as it is a function capable of expressing a characteristic that the watching abandonment rate R2 increases with an increase in the playback start waiting time t2.

Details of step S107 in FIG. 7 (processing of deriving the watching abandonment rate R3) will be described next.

The watching abandonment rate R3 derivation unit 123 applies the playback stop time 3 to the watching abandonment rate derivation function shown in equation (3) below to calculate the estimated value of the watching abandonment rate R3. The watching abandonment rate derivation function is formulated by a logistic function because there is a logistic function relationship between the playback stop time t3 and the watching abandonment rate R3 as illustrated in FIG. 4.

$$R3 = a13 + (a23 - a13)/(1 + (t3/a33)^{a43}) \quad (3)$$

Here, the coefficients a13, a23, a33, and a43 are determined on the basis of the results of the watching abandonment experiment that has been performed in advance, and are stored in the coefficient DB 13.

Another polynomial, exponential function, or the like may be used instead of equation (3) as long as it is a function capable of expressing a characteristic that the watching abandonment rate 3 increases with an increase in the playback stop time t3.

Although an example in which the watching abandonment rate is an index indicating the watching behavior (an index regarding a timing at which watching is stopped) has been described above, a watching retention rate (=1−watching abandonment rate) may be used as the index.

As described above, according to the first embodiment, it is possible to derive the estimated value of the watching abandonment rate R on the basis of the factor index I, which is an index of a video playback state, such as the video quality level and the duration t1 of the video quality level, the playback start waiting time t2, or the playback stop time 3. Here, the value of the factor index I is a value that can be acquired before the viewer stops watching. Thus, according to the embodiment, it is possible to estimate the behavior of the viewer of the video that is distributed via the network even before the viewer stops watching. As a result, a video service provider can implement measures for achieving maintenance and improvement of engagement by improving coding quality or network quality that affects the watching behavior on the basis of the estimated watching behavior.

Next, a second embodiment will be described. Differences between the second embodiment and the first embodiment will be described. Aspects that are not particularly described in the second embodiment may be the same as those in the first embodiment.

In the second embodiment, content of step S103 of FIG. 7 is different from the processing procedure illustrated in FIG. 8. Specifically, the watching abandonment rate R1 derivation unit 121 first derives the video quality Q. A method of deriving the video quality Q is as described with respect to step S201 in FIG. 8. The watching abandonment rate R1 derivation unit 121 then applies the video quality Q and the duration t1 to equation (4) below, which is a logistic function, to calculate the estimated value of the watching abandonment rate R1.

$$R1 = a11(Q) + (a21(Q) - a11(Q))/(1 + (t/a31(Q))^{a41(Q)}) \quad (4)$$

Here, the coefficients a11(Q), a21(Q), a31(Q), and a41(Q) are determined according to the video quality Q on the basis of the results of the watching abandonment experiment that has been performed in advance and stored in the coefficient DB 13.

Another polynomial, exponential function, or the like may be used instead of equation (1) as long as it is a function capable of expressing a characteristic that the watching abandonment rate R1 increases with degradation of video quality and an increase in the duration t1.

That is, in the second embodiment, the estimated value of the watching abandonment rate R1 is derived without dividing the video quality Q into several levels.

Next, a third embodiment will be described. Differences between the third embodiment and the first or second embodiment will be described. Aspects that are not particularly described in the third embodiment may be the same as those in the first or second embodiment.

In the third embodiment, the factor index I corresponding to the watching abandonment rate R3 derivation unit 123 is the resolution re, the bit rate br, the frame rate fr, and the playback stop time t3 (a playback stop time with video quality indicated by the resolution re, the bit rate br, and the frame rate fr). That is, the quality deterioration pattern determination unit 1 outputs the quality deterioration pattern p=3 when the factor index I is the resolution re, the bit rate br, the frame rate fr, and the playback stop time t3.

Figure 9:
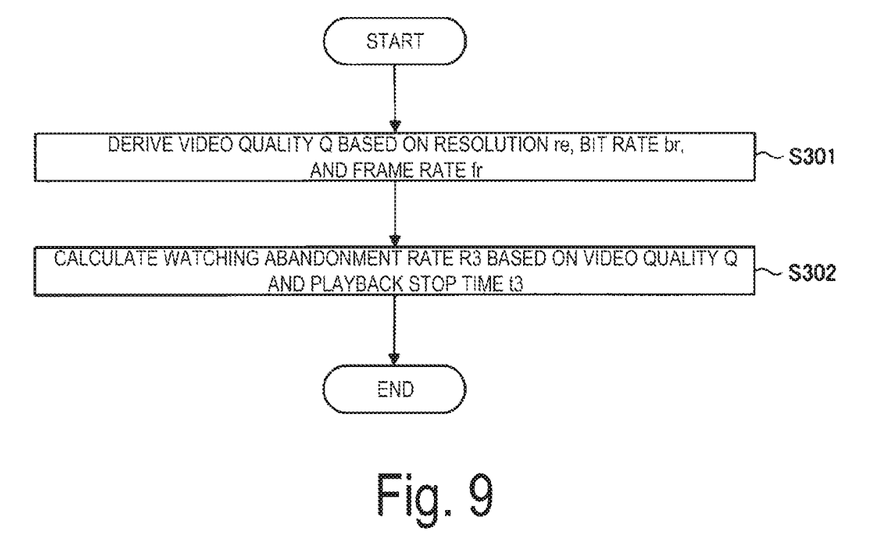
FIG. 9 is a flowchart illustrating an example of a processing procedure of processing of deriving a watching abandonment rate R3 according to a third embodiment.

In the third embodiment, content of step S107 in FIG. 7 is changed as illustrated in FIG. 9. FIG. 9 is a flowchart illustrating an example of a processing procedure for processing of deriving the watching abandonment rate R3 in the third embodiment.

In step S301, the watching abandonment rate R3 derivation unit 123 derives the video quality Q on the basis of the resolution re, the bit rate br, and the frame rate fr included in the factor index I. A method of deriving the video quality Q may be the same as step S201 in FIG. 8.

Subsequently, the watching abandonment rate R3 derivation unit 123 applies the video quality Q, and the playback stop time 3 included in the factor index I to equation (5) below, which is a logistic function, to calculate the estimated value of the watching abandonment rate R3 (S302).

$$R3 = a13(Q) + (a23(Q) - a13(Q))/(1 + (t3/a33(Q))^{a43}(Q)) \quad (5)$$

Here, a13(Q), a23(Q), a33(Q), and a43(Q) are determined according to the video quality Q on the basis of the results of the watching abandonment experiment that has been performed in advance, and stored in the coefficient DB 13. That is, for the playback stop, because the video quality at the time of playback stop also affects the watching abandonment rate R3, a function of deriving the watching abandonment rate R3 from the video quality Q is adopted in the third embodiment.

Another polynomial, exponential function, or the like may be used instead of equation (3) as long as it is a function capable of expressing a characteristic that the watching abandonment rate 3 increases with an increase in the playback stop time t3.

In each of the embodiments described above, the quality deterioration pattern determination unit 11 is an example of an input unit. The watching abandonment rate derivation unit 12 is an example of a calculation unit. The factor index I is an example of a first index. The watching abandonment rate R is an example of a second index. For example, the watching retention rate (=1−watching abandonment rate), or the like may be used as the second index.

The embodiments have been described above, but the present invention is not limited to such specific embodiments, and various modifications and changes can be made within the scope of the gist of the present invention described in the claims.

REFERENCE SIGNS LIST

10 Watching behavior estimation device
11 Quality deterioration pattern determination unit
12 Watching abandonment rate derivation unit
13 Coefficient DB
100 Drive device
101 Recording medium
102 Auxiliary storage device
103 Memory device
104 CPU
105 Interface device
121 Watching abandonment rate R1 derivation unit
122 Watching abandonment rate R2 derivation unit
123 Watching abandonment rate R3 derivation unit
B Bus

The invention claimed is:

1. A watching behavior estimation device comprising:
an input unit configured to receive one or more values for one or more parameters indicating a playback state of a video distributed via a network as input; and
one or more processors configured to execute instructions to perform:
obtaining a factor index from header information of an IP packet regarding video distribution service of the network;
determining a value of a deterioration pattern based on the factor index;
in response to the value of the deterioration pattern indicating that the one or more parameters include a resolution of the video, a bit rate of the video, a frame rate of the video, and a duration for a video quality:
computing a video quality based on the resolution of the video, the bit rate of the video, and the frame rate of the video,
determining, based on the video quality, values of a set of coefficients, and
computing an estimated value of an indicator regarding a behavior of a viewer of the video by applying a first logistic function based on the determined values of the set of coefficients to the duration for the video quality, wherein the indicator is a watching abandonment rate, and the first logistic function for computing the watching abandonment rate is: $R1=q \times (a11(q)+(a21(q)-a11(q))/1+(t1/a31(q))^{a41(q)})$, wherein R1 is the computed watching abandonment rate, q is the determined video quality, t1 is the duration for the video quality, and $a11(q)$, $a21(q)$, $a31(q)$, and $a41(q)$ are the set of coefficients determined based on the video quality q;
in response to the value of the deterioration pattern indicating that the one or more parameters include a playback waiting time of the video, computing the estimated value of the indicator by applying a second logistic function to the playback waiting time of the video; and
in response to the value of the deterioration pattern indicating that the one or more parameters include a playback stop time, computing the estimated value of the indicator by applying a third logistic function to the playback stop time.

2. A watching behavior estimation method causing a computer to execute, the watching behavior estimation method comprising:
receiving one or more values for one or more parameters indicating a playback state of a video distributed via a network;
obtaining a factor index from header information of an IP packet regarding video distribution service of the network;
determining a value of a deterioration pattern based on the factor index;
in response to the value of the deterioration pattern indicating that the one or more parameters include a resolution of the video, a bit rate of the video, a frame rate of the video, and a duration for a video quality:
computing a video quality based on the resolution of the video, the bit rate of the video, and the frame rate of the video,
determining, based on the video quality, values of a set of coefficients, and
computing an estimated value of an indicator regarding a behavior of a viewer of the video by applying a first logistic function based on the determined values of the set of coefficients to the duration for the video quality, wherein the indicator is a watching abandonment rate, and the first logistic function for computing the watching abandonment rate is: $R1=q \times (a11(q)+(a21(q)-a11(q))/1+(t1/a31(q))^{a41(q)})$,
wherein R1 is the computed watching abandonment rate, a is the determined video quality, t1 is the duration for the video quality, and $a11(q)$, $a21(q)$, $a31(q)$, and $a41(q)$ are the set of coefficients determined based on the video quality q;
in response to the value of the deterioration pattern indicating that the one or more parameters include a playback waiting time of the video, computing the estimated value of the indicator by applying a second logistic function to the playback waiting time of the video; and
in response to the value of the deterioration pattern indicating that the one or more parameters include a playback stop time, computing the estimated value of the indicator by applying a third logistic function to the playback stop time.

3. A non-transitory computer readable medium storing instructions that when executed by a computer cause the computer to perform a watching behavior estimation method comprising:
receiving one or more values for one or more parameters indicating a playback state of a video distributed via a network;
obtaining a factor index from header information of an IP packet regarding video distribution service of the network;
determining a value of a deterioration pattern based on the factor index;
in response to the value of the deterioration pattern indicating that the one or more parameters include a resolution of the video, a bit rate of the video, a frame rate of the video, and a duration for a video quality:
computing a video quality based on the resolution of the video, the bit rate of the video, and the frame rate of the video,
determining, based on the video quality, values of a set of coefficients, and
computing an estimated value of an indicator regarding a behavior of a viewer of the video by applying a first logistic function based on the determined values of the set of coefficients to the duration for the video quality, wherein the indicator is a watching abandonment rate, and the first logistic function for computing the watching abandonment rate is: $R1 = q \times (a11(q) + (a21(q) - a11(q))/(1 + (t1/a31(q))^{a41(q)}))$, wherein R1 is the computed watching abandonment rate, q is the determined video quality, t1 is the duration for the video quality, and $a11(q)$, $a21(q)$, $a31(q)$, and $a41(q)$ are the set of coefficients determined based on the video quality q;

in response to the value of the deterioration pattern indicating that the one or more parameters include a playback waiting time of the video, computing the estimated value of the indicator by applying a second logistic function to the playback waiting time of the video; and in response to the value of the deterioration pattern indicating that the one or more parameters include a playback stop time, computing the estimated value of the indicator by applying a third logistic function to the playback stop time.

\* \* \* \* \*